(12) United States Patent
Ryan et al.

(10) Patent No.: US 6,223,123 B1
(45) Date of Patent: Apr. 24, 2001

(54) METHOD AND APPARATUS FOR DIRECTION FINDING

(75) Inventors: Paul A. Ryan, Dublin; Dean E. Ryan, Columbus, both of OH (US)

(73) Assignee: Ryan International Corporation, Columbus, OH (US)

( * ) Notice: Subject to any disclaimer, the term of this patent is extended or adjusted under 35 U.S.C. 154(b) by 0 days.

(21) Appl. No.: 09/138,092

(22) Filed: Aug. 21, 1998

(51) Int. Cl.[7] ............................. G01S 5/04; G01S 03/28
(52) U.S. Cl. ...................... 701/207; 342/432; 342/444
(58) Field of Search ............................. 342/147, 432, 342/434, 435, 437, 444, 450, 455; 367/124, 118; 701/207

(56) References Cited

U.S. PATENT DOCUMENTS

| | | | |
|---|---|---|---|
| 3,893,120 | * 7/1975 | Trenam | 342/432 |
| 3,965,473 | * 6/1976 | Isacson | 342/438 |
| 4,114,157 | * 9/1978 | Hirata | 342/437 |
| 4,277,788 | * 7/1981 | Torby | 342/432 |
| 4,724,442 | * 2/1988 | King | 342/434 |
| 4,780,722 | * 10/1988 | Cusdin | 342/437 |
| 5,077,673 | 12/1991 | Brodegard et al. | 364/461 |
| 5,157,615 | 10/1992 | Brodegard et al. | 364/461 |
| 5,388,047 | 2/1995 | Ryan et al. | 364/461 |
| 5,463,398 | 10/1995 | Young | 342/46 |
| 5,528,244 | 6/1996 | Schwab | 342/37 |
| 5,552,788 | 9/1996 | Ryan et al. | 342/30 |

* cited by examiner

*Primary Examiner*—Ian J. Lobo
(74) *Attorney, Agent, or Firm*—Morgan & Finnegan, LLP

(57) ABSTRACT

Two pairs of signals determinative of bearing to a transmitter are developed from two pairs of directional antennas. The signals, converted to digital form, are compared to each other to develop a result signal. The result signal is used to select a primary pair out of the original two pair of signals. The non-primary pair of signals are compared to each other to develop a binary sign bit. The primary signal pair, the result signal and the sign signal are applied to a table to develop a bearing quantity related to the bearing to the transmitter.

20 Claims, 3 Drawing Sheets

METHOD AND APPARATUS FOR DIRECTION FINDING

TECHNICAL FIELD

The present invention relates to improvements in direction finding, especially useful in aircraft collision avoidance systems.

BACKGROUND OF INVENTION

U.S. Pat. No. 5,552,788 describes an antenna arrangement and signal processing which may be incorporated into an aircraft collision avoidance system. Collision avoidance systems are described in U.S. Pat. Nos. 5,077,673, 5,157,615 and 5,388,047, assigned to the assignee of this application. The disclosure of U.S. Pat. Nos. 5,552,788, 5,388,047, 5,157,615 and 5,077,673 are incorporated herein by reference. One of the advantages of the system described in the '788 patent is a simplified arrangement for using multiple direction finding antenna assemblies. In particular, prior to the '788 patent there were systems with multiple directional antenna assemblies for direction finding purposes which used phase encoded directional information. Extraordinary efforts were therefore necessary in those systems to maintain phase balance between the different channels in the equipment. In the absence of such efforts, the directional information could be lost. One of the improvements described in the '788 patent was a modification to the signal processing so that, to a large extent, the direction or bearing information was encoded in amplitude as opposed to phase.

This greatly-simplified the complexity, and as a result limited the cost of the equipment.

As described in the '788 patent, a pair of directional antennas are employed, each pair consisting of a pair of monopole antennas and a hybrid circuit. Preferably, the axes of the pair of directional antennas are orthogonal to each other. One most preferred mounting arrangement is to have one of the directional antennas on an uppermost surface of the aircraft or host, with the other directional antenna mounted on a lowermost surface of the aircraft or host.

Regardless of whether or not the transmitter being located is above or below the host in altitude, one of the pair of directional antennas is in the "shadow" of the body of the host aircraft. If the transmitter being located is above the host aircraft, then the body of the host aircraft will shadow the lowermost directional antenna, and vice versa.

As described in the '788 patent, signals are derived from the pair of directional antennas, the signals are processed and then applied to a table with information allowing the bearing of the transmitter to be located based on the directional antenna signals.

In particular, each directional antenna developed a pair of signals, from the hybrid, whose amplitudes indicated bearing of the transmitter relative to the axis of the directional antenna. A bearing memory stored bearing information as a function of two pairs of inputs. The two pairs of inputs, each pair of inputs from one of the directional antennas, was then applied to the bearing memory so as to develop bearing information.

SUMMARY OF INVENTION

The present invention improves the direction finding method and system described in the '788 patent.

Our studies lead us to believe that because one of the directional antenna's is usually in the shadow of the host, the signals from that antenna are not as reliable for direction finding purposes. In fact, use of both pairs of signals could degrade the direction finding process. Unfortunately it is not possible to limit the system to the use of only one pair of signals since there is an ambiguity in direction finding based only on one pair of the antenna signals. The apparatus of the invention uses only one pair of signals for direction finding but augments that pair by one bit of information from another pair of the antenna signals in order to resolve the directional ambiguity. In addition the apparatus of the invention automatically determines which pair of signals to use for optimum direction finding and therefore derives the additional bit of information for ambiguity resolution from the, otherwise, unused pair of antenna signals.

In particular, of the four signals produced by the two directional antennas, amplitudes of only a pair of the signals are employed in the direction finding process. A comparator or voting logic circuit has, as inputs, both pairs of signals and the voting logic or comparison circuit selects only one of the pair of signals for primary use in direction finding. Both pairs of signals are applied to sign generating circuits. Bearing is determined from the amplitude of the pair of signals selected by the comparison or voting logic circuit taken in conjunction with the output of the sign generating circuit corresponding to the unselected pair of signals.

Since the embodiment of the invention which has been built and tested is digital, use of terms such as "amplitude", "comparator", or "circuit" in the preceding description should not be taken as an indication that the implementation is analog; in fact signals taken from the hybrids are digitized so that much of the processing is effected in the digital domain.

BRIEF DESCRIPTION OF THE DRAWINGS

The present invention will now be further described in the following portions of the specification when taken in conjunction with the attached drawings in which.

DETAILED DESCRIPTION OF PREFERRED EMBODIMENTS

Figure 1:
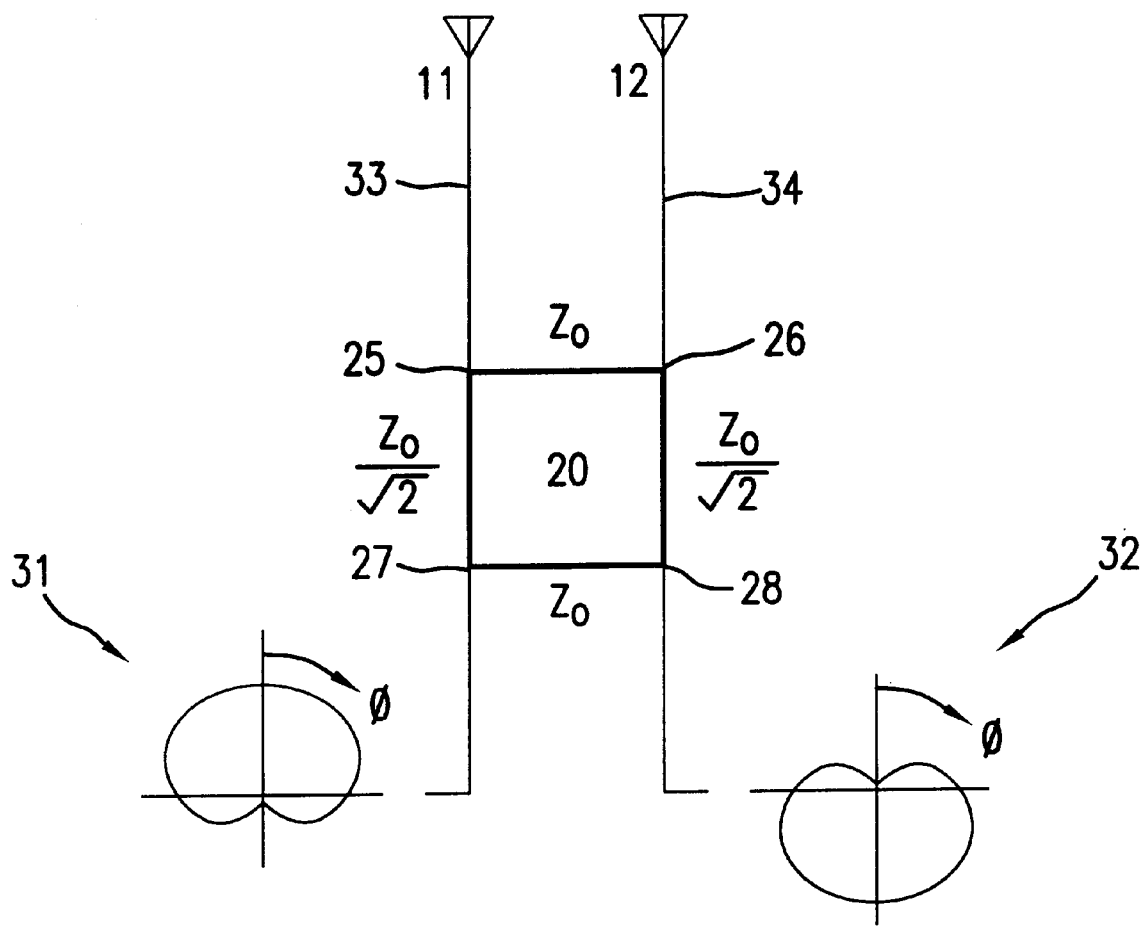
FIG. 1 is a block diagram illustrating a typical directional antenna and its associated antenna patterns.

In order to develop bearing information, signals are derived from a directional antenna; a suitable directional antenna is schematically illustrated in FIG. 1. The directional antenna illustrated in FIG. 1 includes a pair of monopole antennas 11 and 12, preferably spaced a quarter wavelength apart. Signals from each of the monopoles 11 and 12 are coupled via conductors 33 and 34 to inputs 25, 26 of a hybrid circuit 20. Outputs 27 and 28 of the hybrid 20 provide signals whose amplitudes take the form in the representative diagrams 31 and 32, respectively, as a function of bearing angle $\phi$. The hybrid circuit 20, the monopole antennas 11 and 12, and the relationship therebetween are described in detail in U.S. Pat. No. 5,552,788. In this application, the combination of the monopoles 11, 12 and the hybrid 20 are referred to as a directional antenna, In the U.S. Pat. No. 5,552,788 the same collection of equipment is referred to as a split array antenna. Preferably, the monopoles 11, 12 and hybrid 20 are manufactured as a unit.

Figure 2A:
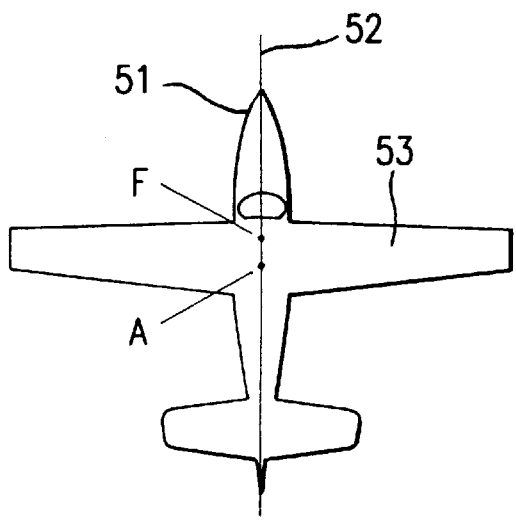
FIGS. 2A–2D illustrate one arrangement for locating the directional antennas relative to the body of a host aircraft and the associated antenna pattern.
Figure 2B:
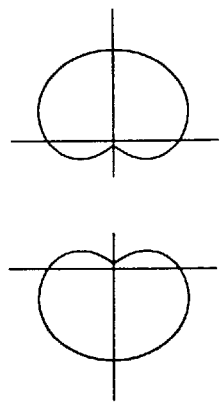
Figure 2C:
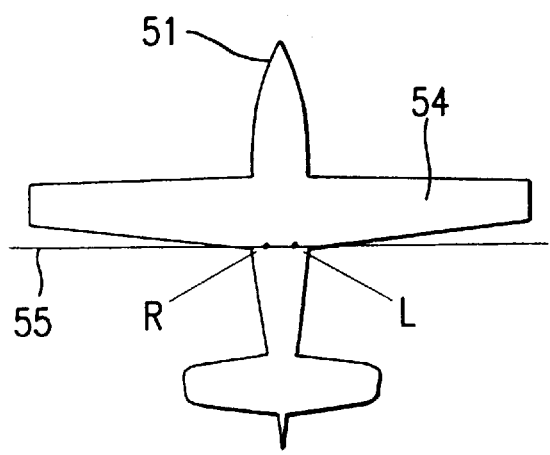
Figure 2D:
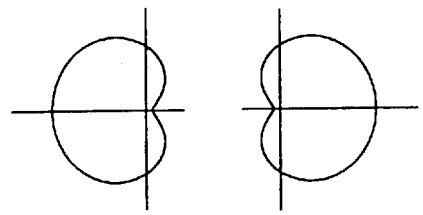

FIGS. 2A and 2C show the top 53 and the bottom 54 of a host aircraft 51. FIG. 2A shows the placement of two monopoles F and A relative to a longitudinal axis 52 of the aircraft 51. FIG. 2B shows the resulting antenna patterns that are available from the outputs 27, 28 of an upper hybrid 20 which is associated with the monopoles F and A. FIG. 2C illustrates a second directional antenna comprising the monopoles R and L, located along a transverse axis 55 of the host aircraft 51. FIG. 2D shows the antenna patterns associated with a lower hybrid 20 which forms part of the directional antenna including the monopoles R and L.

Thus, as is illustrated in FIGS. 2A and 2C, the axes 52, 55 of the directional antennas (one including the monopoles F and A, and the other including the monopoles R and L) are orthogonal to each other. While FIGS. 2A and 2C are only one example of how the two directional antennas which are employed in the invention can be related to each other, it is preferred that the antenna axes remain orthogonal. It should be clear to those skilled in the art, however, that it is not essential for the axes of the directional antennas to be coaxial with either the principal longitudinal or transverse axis of the host aircraft.

Figure 3:
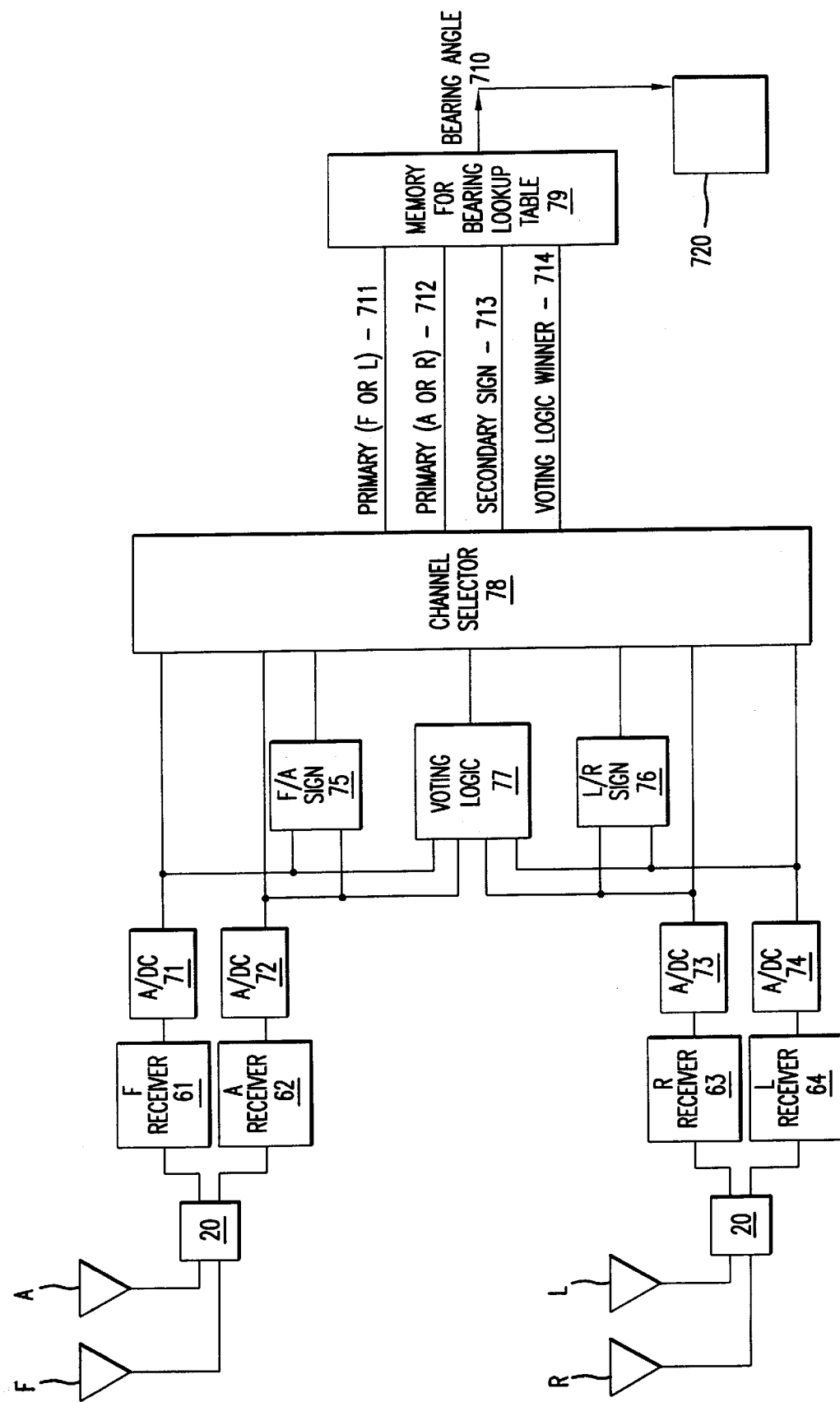
FIG. 3 is a block diagram illustrating the apparatus associated with the directional antennas in order to provide the appropriate signal processing to produce accurate bearing determinations.

FIG. 3 is a block diagram which is useful in explaining the signal processing. A first directional antenna comprises the monopoles F and A and the hybrid 20 coupled thereto. A second directional antenna comprises the monopoles R and L and the hybrid 20 connected thereto. The two hybrids 20 each have two outputs. The four channels defined by the outputs of the two hybrids 20 are termed the F channel, A channel, R channel and L channel. Each of the channels includes a receiver which is driven by the associated output of the hybrid 20. Each receiver has an output coupled to an analog-to-digital converter. FIG. 3. shows receivers 61–64 and analog-to-digital converters 71–74 corresponding to the F, A, R and L channels, respectively.

The receivers 61–64 are designed to receive (in frequency and format) whatever signal is expected from the transmitter which is the subject of the bearing determination performed by the subject matter of the invention. As one example, the bearing of an aircraft may be determined from its transponder transmissions. The frequency and format of such transmissions are described in U.S. Pat. No. 5,077,673.

The outputs of the analog-to-digital converters 71 and 72 are coupled as inputs to an F/A sign circuit 75 and the voting logic circuit 77. In a similar fashion, the outputs of the analog-to-digital converters 73 and 74 comprise inputs to the L/R sign circuit 76 and the voting logic circuit 77.

The sign generating circuits 75 and 76 compares the amplitude of its inputs (either F and A for sign circuit 75 or L and R for sign circuit 76) and outputs a binary sign signal indicating which of the inputs is greater in amplitude. For example, the F/A sign circuit 75 outputs a binary signal of one sense if the amplitude of the F signal is greater than the amplitude of the A signal, and vice versa. Similar remarks apply to the sign circuit 76. From the preceding descriptions, those skilled in the art will, understand how to implement the directional antennas, the receivers 61–64, the analog to digital converters 71–74 and the sign circuits 75 and 76.

The voting logic circuit 77 compares the values of its inputs (from the F & A and L & R channels) to determine which pair of the two pairs of signals should be used as the primary indicator of bearing.

There are a variety of algorithms that could be used to make this selection, one preferred algorithm is to determine of the two pairs of signals (F and A on the one hand and L and R on the other hand) which of the pair includes the signal of lowest amplitude. The particular pair of signals which includes the signal of lowest amplitude is the non-preferred pair, i.e. the other pair is used as the primary indicator of bearing.

An alternative algorithm is to determine which pair of signals has the largest average amplitude. The signal pair having the largest average amplitude would then be used as the preferred signal pair for bearing determination.

Those skilled in the art will understand that either of the foregoing algorithms, or others can be implemented with either signals of analog or digital form. The example described here is the use of digital signals. Implementing either of algorithms described above is well within ordinary skill.

By now it should be apparent that the outputs of the sign circuit 75, 76 and the voting logic circuit 77 are binary and are, as is seen in FIG. 3, input to the channel selector 78. The other inputs to the channel selector are the outputs of the analog-to-digital converters 71–74 representing the amplitudes of the signals on each of the four channel, F, A, R and L. The channel selector 78 is in essence a gate. The control input is the output of the voting logic circuit 77. Based on the sense of the output of the voting logic circuit 77, the channel selector will select and pass on a set of digital signals including outputs of a pair of analog to digital converters and the output of one of the sign circuits 75 and 76. If the voting logic circuit selects the F/A pair as the primary pair then the selector 78 will pass the outputs of the F/A channels as well as the output of the sign circuit 76 and if the voting logic circuit selects the L/R pair as the primary pair then the selector 78 will pass the outputs of the L/R channels as well as the output of the sign circuit 75. In either case, the output of the voting logic circuit 77 is also passed on. The selected outputs of the analog-to-digital converters appear on the lines 711, 712, the output of the sign circuit appears on the output 713 and the output of the voting logic circuit 77 appears on the output circuit 714. Each of these four signals is input to the bearing look-up table memory 79. Based on the four input parameters, the bearing look-up table 79 outputs of the value of the bearing angle corresponding to those four inputs.

Having determined the bearing angle of the transmitter, that information can be communicated to the user in one or more conventional fashions. The bearing angle can be expressed as a numerical quantity and then displayed in a multi-digit alphanumeric or numeric display or graphically in any of a number of conventional graphic displays.

Alternatively the numeric bearing information may be expressed audibly in a spoken manner or coded in some other fashion. To this end, FIG. 3 shows that the output of the memory 79, comprising bearing information, is input to a bearing information converter 720. The converter 720 makes the bearing information intelligible to the user. It may include a display such as a graphic display (LCD or CRT or the like) of a numeric or alphanumeric display. In either case the converter takes the digitally encoded information from the memory 79 and converts that information to suit the particular form of the output 720. While the preceding has described different forms of a visible or visual output, the converter 720 may also include an audible output in which the bearing information is converted to spoken form or some other form of audibly perceptible encoding.

FIG. 1 illustrates the bearing angle φ as clockwise from the axis joining the monopole elements, with the phase center located midway between the monopole elements. The forward direction (F) is defined as a direction of the forward monopole, and the aft direction (A) is defined is a direction of the aft monopole (see for example FIG. 2A). Using these conventions, the normalized antenna pattern equations are $$[F]=(1/\sqrt{2})|\cos[(\pi/4)\cos\phi]+\sin[(\pi/4)\cos\phi]| \quad (1)$$

$$[A]=(1/\sqrt{2})|\cos[(\pi/4)\cos\phi]-\sin[(\pi/4)\cos\phi]| \quad (2)$$

where F is the antenna pattern with forward directivity and A is the antenna pattern having aft activity.

There is a second directional antenna mounted with axis orthogonal to the first. The right R direction, is defined as the direction of the right monopole and the left, L direction, is defined as the direction of the left monopole. The normalized antenna pattern equations are:

$$[R]=(1/\sqrt{2})|\cos[(\pi/4)\sin\phi]+\sin[(\pi/4)\sin\phi]| \quad (3)$$

$$[L]=(1/\sqrt{2})|\cos[(\pi/4)\sin\phi]-\sin[(\pi/4)\sin\phi]| \quad (4)$$

where R is the antenna pattern with right directivity and L is the antenna pattern having left directivity.

The circuitry, using the voting logic circuit 77, will determine which of the two directional antennas is the most reliable for bearing determination. This pair is then assigned to act as the primary antenna with the remaining directional antenna referred to as the secondary antenna. Selection of the primary antenna is made on the basis of which antenna provides the highest amplitude gradients with respect to changing bearing angle. Bearing is then determined using signals from the primary antenna, with the secondary antenna providing a sense signal for ambiguity resolution.

Although different combinations of antenna signals can be used to perform these requirements, the preferred combination is to directly use the F and A signals from the antennas, mounted with elements forward and aft, and the R and L signals from the antenna mounted with elements right and left. The relationship between the ratio of the aft antenna signals A and the forward antenna signals F to the bearing angle is calculated as follows:

$$[A]/[F]=|\cos[(\pi/4)\cos\phi]-\sin[(\pi/4)\cos\phi]|/|\cos[(\pi/4)\cos\phi]+\sin[(\pi/4)\cos\phi]| \quad (5)$$

$$[A]/[F]=|\sin[(\pi/4)(\cos\phi-1)]/\cos[(\pi/4)(\cos\phi-1)]| \quad (6)$$

$$[A]/[F]=-\tan[(\pi/4)(\cos\phi-1)] \quad (7)$$

$$\cos\phi=1-(4/\pi)\tan^{-1}([A]/[F]) \quad (8)$$

$$\phi=\cos^{-1}[1-(4/\pi)\tan^{-1}([A]/[F])] \quad (9)$$

The relationship between the ratio of the signals from the antennas L and R to the bearing angle is:

$$[L]/[R]=-\tan[(\pi/4)(\sin\phi-1)] \quad (10)$$

$$\phi=\sin^{-1}[1-(4/\pi)\tan^{-1}([L]/[R])] \quad (11)$$

The table below shows a portion of the data from an implementation of the memory 79. The table has five columns, the first four represent input data (i.e., addressing) and the last column represents the addressed or stored data, i.e., the bearing information. In this implementation the amplitude information (first and second columns of the table) represented digitally in 7 bits and the sign and voting logic outputs are each single bit (third and fourth columns). The first column of the table represents data on line 711, that is either amplitude information from the F or L channels, depending on the selection of the voting logic. The second channel represents data on line 712, that is either amplitude information from the aft or right channel. The third column identifies data from line 713, that is either output of sign circuits 75 or 76. The fourth column presents information on line 714, that it identifies the output of the voting logic circuit and identifies the selection of the primary directional antenna, either F/A or L/R. This four pieces of information address the memory, the addressed location stores bearing information which is then output to the converter 720. The stored information representing bearing is shown in the fifth column of the table.

| 711 | 712 | 713 | 714 | Bearing |
|-----|-----|-----|-----|---------|
| 242 | 7 | 0 | 0 | 97 |
| 243 | 7 | 0 | 0 | 97 |
| 244 | 7 | 0 | 0 | 97 |
| 245 | 7 | 0 | 0 | 97 |
| 246 | 7 | 0 | 0 | 97 |
| 247 | 7 | 0 | 0 | 97 |
| 248 | 7 | 0 | 0 | 97 |
| 249 | 7 | 0 | 0 | 98 |
| 250 | 7 | 0 | 0 | 98 |
| 251 | 7 | 0 | 0 | 98 |
| 252 | 7 | 0 | 0 | 98 |
| 253 | 7 | 0 | 0 | 98 |
| 254 | 7 | 0 | 0 | 98 |
| 255 | 7 | 0 | 0 | 98 |
| 0 | 7 | 1 | 0 | 180 |
| 1 | 7 | 1 | 0 | 145 |
| 2 | 7 | 1 | 0 | 130 |
| 3 | 7 | 1 | 0 | 118 |
| 4 | 7 | 1 | 0 | 109 |
| 5 | 7 | 1 | 0 | 102 |
| 6 | 7 | 1 | 0 | 95 |
| 7 | 7 | 1 | 0 | 90 |
| 8 | 7 | 1 | 0 | 85 |
| 9 | 7 | 1 | 0 | 80 |
| 10 | 7 | 1 | 0 | 77 |
| 11 | 7 | 1 | 0 | 73 |
| 12 | 7 | 1 | 0 | 70 |
| 13 | 7 | 1 | 0 | 68 |
| 14 | 7 | 1 | 0 | 65 |
| 15 | 7 | 1 | 0 | 63 |
| 16 | 7 | 1 | 0 | 61 |
| 17 | 7 | 1 | 0 | 59 |
| 18 | 7 | 1 | 0 | 58 |
| 19 | 7 | 1 | 0 | 56 |
| 20 | 7 | 1 | 0 | 55 |
| 21 | 7 | 1 | 0 | 53 |
| 22 | 7 | 1 | 0 | 52 |
| 23 | 7 | 1 | 0 | 51 |
| 24 | 7 | 1 | 0 | 50 |
| 25 | 7 | 1 | 0 | 49 |
| 26 | 7 | 1 | 0 | 48 |
| 27 | 7 | 1 | 0 | 47 |
| 28 | 7 | 1 | 0 | 46 |
| 29 | 7 | 1 | 0 | 45 |
| 30 | 7 | 1 | 0 | 44 |
| 31 | 7 | 1 | 0 | 44 |
| 32 | 7 | 1 | 0 | 43 |
| 33 | 7 | 1 | 0 | 42 |
| 34 | 7 | 1 | 0 | 42 |
| 35 | 7 | 1 | 0 | 41 |
| 36 | 7 | 1 | 0 | 40 |

The foregoing has described an example of the invention which should not be limiting. Rather the scope of the invention should be construed in accordance with the claims appended to this specification.

What is claimed is:

1. A method of determining bearing to a transmitter, from a receiver, based on signals generated by a pair of directional antennas of said receiver, said method comprising the steps of:

a) generating first and second signals from a first one of said directional antennas, b) generating third and fourth signals from a second one of said directional antennas, c) comparing amplitudes of the first and second signals with amplitudes of the third and fourth signals and generating a result signal, dependent on said comparison, said result signal representing a selection of either said first and second signals or said third and fourth signals as a primary signal pair for a bearing determination, d) generating, based on a comparison of amplitudes of that signal pair not selected as said primary signal pair, a, sign signal, e) applying information representing said primary signal pair, and information representing said sign signal, to a bearing storage array, and f) selecting bearing information from said bearing storage array based on said applied information.

2. The method of claim 1 further including the step of displaying the bearing information.

3. The method of claim 1 wherein said directional antennas each have axes which are orthogonal to each other and wherein the comparison step selects that pair of signals not containing the signal of minimum amplitude.

4. The method of claim 1 wherein the comparison step selects that pair of signals not containing the signal of minimum amplitude and which includes the further step of converting said first through said fourth signals from analog form to digital form.

5. The method of claim 1 wherein said directional antennas have axes which are orthogonal to each other and wherein the comparison step selects that pair of signals which has greater average amplitude.

6. The method of claim 1 wherein said applying step includes:

e1) applying information representing amplitudes of said first through said fourth signals to a bearing storage array, and e2) using said result signal to inhibit use of either said first and second or said third and fourth signals for addressing said array.

7. The method of claim 1 wherein said converting step includes presentation of audible bearing indication.

8. Bearing determination apparatus comprising:

first directional antenna means for producing a first pair of signals related to bearing between a transmitter and an axis of the first directional antenna means, second directional antenna means for producing a second pair of signals related to bearing between said transmitter and an axis of the second directional antenna means, means for comparing amplitudes of said first and second pairs of signals to generate a result signal representing a result of said comparison, bearing information storage means for storing information relating input information to bearing information, and selection means responsive to said result signal to pass, as input information, information related to signal amplitude of said first or said second pair of signals, to said bearing information storage means.

9. Bearing determination apparatus as recited in claim 8 wherein an axis of the second directional antenna means is orthogonal to an axis of the first directional antenna means.

10. Bearing determination apparatus as recited in claim 8 wherein the means for comparing produces a result signal to select that one of the pair of signals which does not contain the signal of lowest amplitude.

11. Bearing determination apparatus as recited in claim 8 wherein the means for comparing produces a result, signal to select that one of the pair of signals which has the higher average amplitude.

12. Bearing determination apparatus as recited in any of claims 8–11 which further includes bearing output means connected to the bearing information storage means for converting bearing information to intelligible form.

13. Bearing determination apparatus as recited in claim 12 wherein the bearing output means includes a visible display.

14. Bearing determination apparatus as recited in claim 12 wherein the bearing output means generates an audible output.

15. A bearing determination system comprising:

first and second antenna pairs, each with an axis, the axes of said antenna pairs making an angle with each other, first and second hybrid circuits, each coupled to one of the first and second antenna pairs, comparison means responsive to information related to amplitudes of pairs of signals output from the first and second hybrid circuits to generate a select signal, first and second sign generating circuits, each of the sign generating circuits responsive to information related to a pair of signals output from one of the hybrid circuits for generating a sign signal related to the amplitude of signals output from the hybrid circuit, a memory storing bearing information as a function of a pair of signal amplitudes and a sign signal, a gate coupled to the selection signal, to information related to the amplitudes of pairs of signals output from the hybrid circuits and to outputs of the sign generating circuits for passing information related to one of the pairs of signals and output of one of the sign generating circuits and the select signal to the memory.

16. The system as recited in claim 15 wherein the comparison means produces a select signal to select that pair of signals without a signal of minimum amplitude.

17. The system as recited in claim 15 wherein the comparison means produces a select signal to select that pair of signals of greatest average amplitude.

18. The system as recited in claim 15 which further includes a bearing information output responsive to the memory for converting bearing information to intelligible form.

19. The system as recited in claim 18 wherein the intelligible form is visual.

20. The system as recited in claim 18 wherein the intelligible form is audible.

* * * * *